June 16, 1936.  L. D. COBB  2,044,380
BEARING AND SEAL THEREFOR
Filed May 20, 1930  2 Sheets-Sheet 1
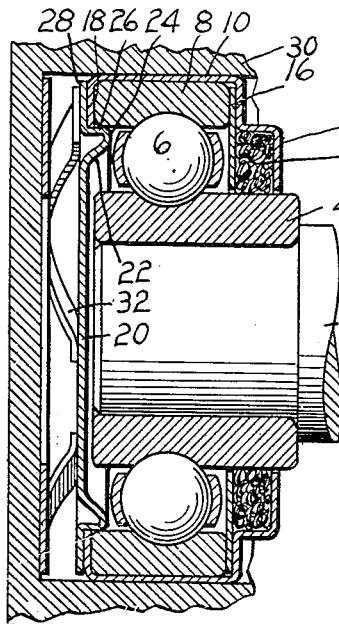
FIG. 1.
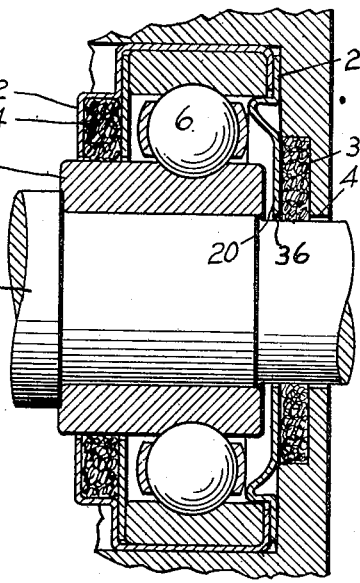
FIG. 2.
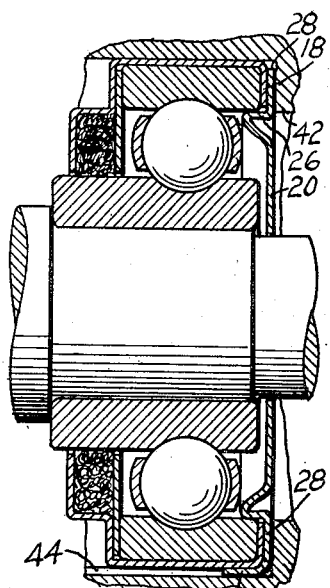
FIG. 3.
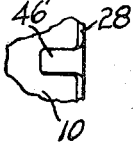
FIG. 4.
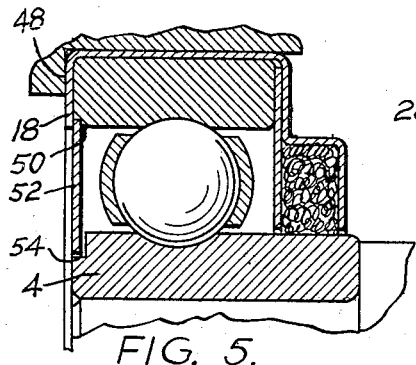
FIG. 5.
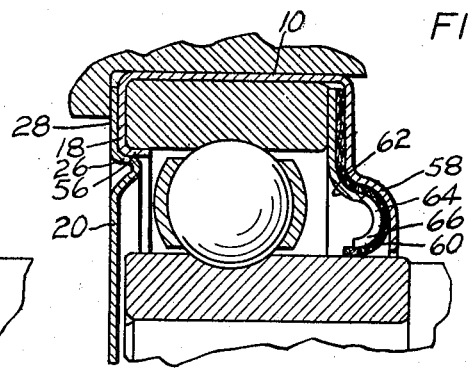
FIG. 6.
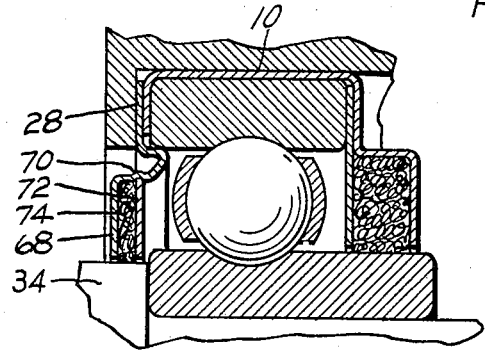
FIG. 7.
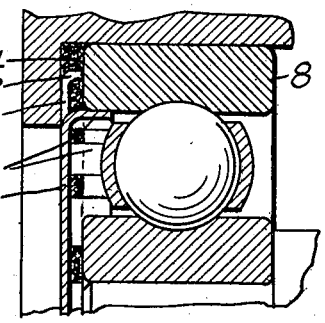
FIG. 8.
INVENTOR:
LELAND D. COBB,
BY
HIS ATTORNEY.

June 16, 1936.                L. D. COBB                2,044,380
                       BEARING AND SEAL THEREFOR
                         Filed May 20, 1930            2 Sheets-Sheet 2
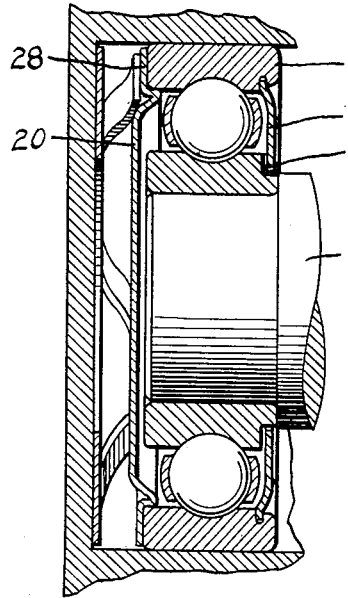
FIG. 9.
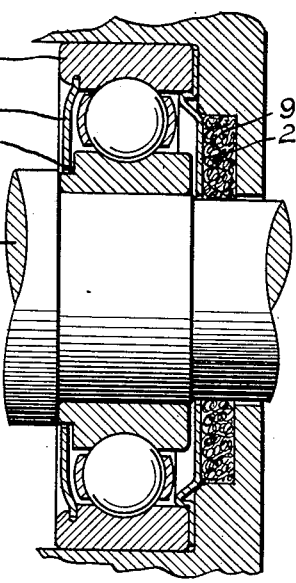
FIG. 10.
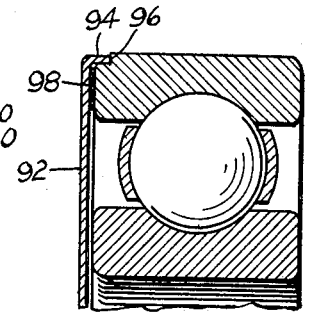
FIG. 11.
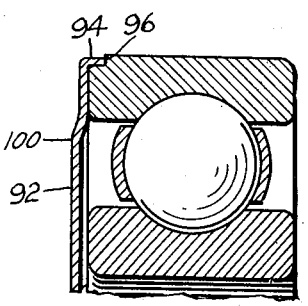
FIG. 12.
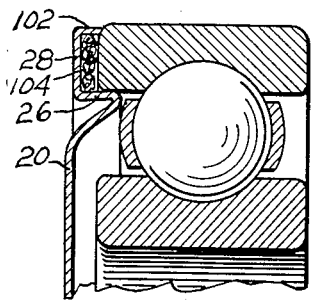
FIG. 13.
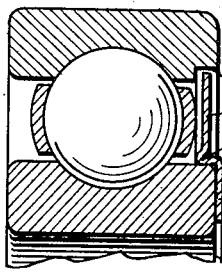
FIG. 14.
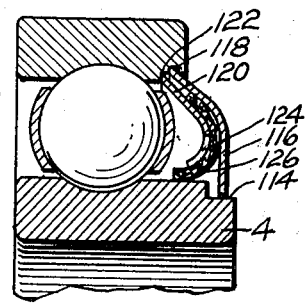
FIG. 15.
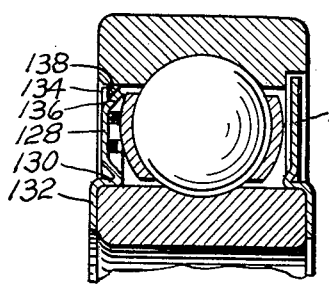
FIG. 16.
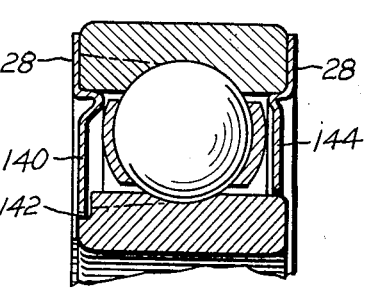
FIG. 17.
INVENTOR:
LELAND D. COBB,
BY
HIS ATTORNEY.

Patented June 16, 1936

2,044,380

UNITED STATES PATENT OFFICE 2,044,380

BEARING AND SEAL THEREFOR

Leland D. Cobb, Bristol, Conn., assignor, by mesne assignments, to General Motors Corporation, Detroit, Mich., a corporation of Delaware Application May 20, 1930, Serial No. 453,932

9 Claims. (Cl. 308—187)

This invention relates to bearings and seals therefor and comprises all the features of novelty herein disclosed. An object of the invention is to provide an improved unit-handling bearing and lubricant retainer. Another object is to provide an improved lubricant retainer which is readily detachable from a bearing when mounting the latter but which is a part of the bearing during shipment and during use after mounting.

To these ends and to improve generally and in detail upon devices of this character, the invention consists in the various matters hereinafter described and claimed. In its broader aspects, the invention is not necessarily limited to the specific construction selected for illustration in the accompanying drawings in which—

Fig. 1 is a cross-sectional view of a sealed-up bearing and its mounting.

Figs. 2 and 3 are similar views of modifications.

Fig. 4 is a detail view of a portion of the bearing of Fig. 3.

Figs. 5, 6 and 7 are views similar to Fig. 1 showing modifications of sheet metal encased bearings and seals therefor.

Figs. 8 to 17, inclusive, are cross-sectional views of modified forms of bearings and seals wherein the outer race rings are adapted to fit directly in a housing without having an interposed shell or casing.

Referring to Fig 1, the numeral 4 indicates the inner race ring of antifriction bearing herein shown as having a row of balls 6 and an outer race ring 8. A sheet metal casing or shell 10 encloses the outer race ring, one end of the shell having a bent or cupped portion 12 enclosing a sealing washer 14 which is also retained internally by a plain washer 16 engaging the end of the outer race ring and held by the bent portion of the shell. The sealing washer 14 engages a finished face on the outer periphery of the inner race ring 4 which is axially extended beyond the outer race ring and through the end of the shell. The other end of the shell has a holding flange 18 bent down against the opposite end of the outer race ring, preferably terminating about in line with the inner surface of the latter. The rolling elements engage opposed raceway grooves and so hold the race rings against axial displacement with the end faces of the rings substantially flush with one another at one end of the bearing.

A closure plate is detachably carried by the outer race ring and comprises a circular body portion 20, an inwardly bent portion 22, a short connecting rounded bead 24, an outwardly bent springy portion 26, and a circular rim 28. The portion 26 is very slightly tapered initially with the larger diameter at the bead 24 but when the closure plate is pressed axially of the bearing, the portion 26 is cammed inwardly by the rounded bead 24 and snaps within the end of the flange 18 and within the outer race ring 8. The rim and the body portion are preferably flat and in a plane parallel to the adjacent end faces of the race rings, and the intermediate connecting portion forms a reversely curved projection or annular loop entering axially between the race rings. The rim 28 abuts flatwise against the flange 18 and acts as a stop which holds the body portion 20 spaced from the inner race ring. According to one typical way of mounting the bearing, the shell 10 is slidably fitted in the bore of a housing 30 while a disc having spring fingers 32 engages the bottom of the housing and the rim 28. The inner race ring 4 is pressed on a shaft 34 against a shoulder thereof and resists the thrust load applied by the spring disc. The bearing and shell have the closure plate assembled with them for shipment and completely protect the bearing parts from foreign matter and retain the lubricant. When ready to mount the bearing on its shaft, the closure plate is readily pried off temporarily by a sharp pointed instrument forced down inside the rim 28 which is readily accessible beyond the end of the bearing and when the inner race ring is put on the shaft, the closure plate is snapped on again simply by axial pressure. The bearing and shaft are then ready to slip into the housing 30. No grooves or slots are needed in the race ring to hold the closure plate and, to further facilitate removal of the plate for assembly purposes, the bearing can be shipped with the rim 28 of the closure plate slightly spaced from the flange 18 or extended beyond the beginning of the little bend thereon.

Fig. 2 shows the body 20 of the closure plate provided with an opening 36 to surround a projecting portion of the shaft 34, the body holding a sealing washer 38 in a recess of the housing which likewise has an opening 40 for the shaft. This figure shows a typical companion mounting to that of Fig. 1, the bearing being turned around so that the rim 28 of the closure plate will abut against the bottom of the housing.

Fig. 3 is similar to Fig. 2, the bearing support or housing having a shoulder 42 to act as a stop and a keyway or slot 44 engaged by a projection or tab 46 which is bent around the shell 10 from the rim 28 of the closure plate, this device being provided to retain the outer race and its shell from rotation. The springy portion 26 of the closure plate clears the terminus of the shell flange 18.

In Fig 5, the shell flange 18 abuts flatwise against a shoulder 48 of a housing and its terminal edge cooperates with a notch 50 of the outer race ring to form a groove receiving and holding a straight closure plate 52 which has running clearance with a notch 54 of the inner race ring 4.

Fig. 6 has a closure plate 20 similar to Fig. 1 but the springy portion 26 thereof fits within a flange 56 which is bent around against the inner face of the outer race ring from the shell flange 18. The shell 10 has its opposite end provided with the wavy portion 58 enclosing a washer 60, preferably of leather, a metal washer 62 abutting against the outer race ring and having a reversely curved end which is provided with slits 64 thus leaving a plurality of curved spring fingers 66 which press the leather washer against the finished outer surface of the inner race ring and make a reliable closure having capillary properties tending to hold in lubricant.

In Fig. 7, the closure plate has an offset or cupped portion with a terminal flange 68 carried close to the shouldered part of the shaft 34. The cupped portion is provided with a bend 70 forming a groove to hold a plain washer 72 which cooperates with the terminal flange 68 to hold a sealing washer 74. In this instance, the closure plate is not necessarily detached in order to mount the bearing on the shaft.

In Fig. 8, the closure plate 76 is slit at the outer edge or rim to provide axially directed spring fingers 78 and radial spring fingers 80, the former entering the outer race ring and the latter terminating in short projections 82. The projections grip a sealing washer 84 which fills the space between the end of the outer race ring and the housing.

In Figs 9 and 10 the closure plates are similar to those of Figs. 1 and 2 but the bearings fit the housing bores directly and have no shells. To secure the desired clearance of the closure plate with the inner race ring, the body 20 is offset outwardly with respect to the rim 28 to make up for the absence of the shell flange. The offset is preferably obtained by making the laterally extending walls of the annular loop or projection of unequal length. These bearings may conveniently be closed at the other side by washers 86 held in a groove of the outer race ring and having running clearance with a groove 88 of the inner race ring. The offset body 20 of Fig. 10 may enter the housing recess to engage a sealing washer 90.

In Fig. 11, a closure plate 92 has a rim flange 94 snapped in a notch 96 at the outer periphery of the outer race ring. A sealing ring or washer 98 is interposed between the plate and the outer race ring thus sealing the joint and serving to space the closure plate from the inner race ring.

Fig. 12 is similar to Fig. 11 but the closure plate rests against the end of the outer race ring and running clearance with the inner race ring is provided by bending or offsetting the body of the plate from the rim as indicated at 100.

In Fig. 13, the rim 28 of the closure plate is provided with a bent-in flange 102, and a sealing washer 104 is held between the flange and the springy portion 26 of the closure plate.

In Fig. 14, the closure plate is carried by the inner race ring and comprises an inner rim 106 which abuts against the end of the inner race ring, a springy connecting portion 108 which snaps on the outer periphery of the inner race ring, and a body portion 110 which is offset inwardly to lie in the space between the race rings. The outer race ring is notched at 112 to receive the outer edge of the closure plate with running clearance.

In Fig. 15, an axially extended part of the inner race ring 4 is notched at 114 to receive the edge of an outer closure plate 116 which is dished and confined at its outer edge in a notch 118 of the outer race ring. A dished washer 120 has its outer edge snapped in a second notch 122 of the outer race ring and its inner curved edge is slit to form spring fingers 124 which press a sealing washer 126 against a finished face of the inner race ring.

Fig. 16 has one side similar to Fig. 14. At the other side is a closure plate 128 having a springy portion 130 snapped on the inner race ring and an inner rim portion 132 abutting against the end of the race ring. The plate is offset inwardly with respect to the rim 132 and is slit at its outer edge to form spring fingers 134 and 136 which confine a sealing ring or washer 138 engaging the bore of the outer race ring.

Fig. 17 shows closure plates adapted for opposite sides of a loading groove bearing. At the loading groove side indicated by the broken lines, the plate has its body portion 140 offset inwardly with respect to the rim 28 and is extended past the loading groove to run in a notch 142 of the inner race ring. At the other side of the bearing, the body portion 144 is offset to a greater degree from the rim 28 to bring the plate close to a finished cylindrical face of the inner race ring inside the usual chamfer.

I claim:

1. In a unit-handling antifriction bearing and lubricant retainer, an inner race ring, an outer race ring, a series of rolling elements between the race rings, a sheet metal closure plate detachably carried by the bearing to close the space between the race rings, said plate comprising a flat body portion and a flat rim portion in substantially the same plane, an annular loop resiliently connecting the two portions, a shell enclosing the outer race ring and having a flange extending along one of its end faces, the rim portion engaging the side of the flange and the loop projecting laterally within said flange and within the inner peripheral surface of the outer race ring, substantially as described.

2. In a unit-handling antifriction bearing and lubricant retainer, an inner race ring and an outer race ring having their end faces substantially flush with one another at at least one end of the bearing, a series of rolling elements engaging opposed grooves in the race rings and holding the race rings from axial displacement with said end faces flush, a sheet metal closure plate detachably carried by the bearing at said one end and comprising a flat body portion, a flat rim portion, and a resilient reversely curved portion connecting the body portion and the rim portion together, the resilient portion entering between the race rings and yieldingly gripping one of the latter, and the rim portion extending along-side of the end of the outer race ring for limiting movement of the resilient portion between the race rings and for causing the body portion to be held in clearance relation with the end face of the other race ring; substantially as described.

3. In a unit-handling antifriction bearing and lubricant retainer, an inner race ring and an outer race ring having their end faces substantially flush with one another at at least one end of the bearing, a series of rolling elements engaging opposed grooves in the race rings and holding the race rings from axial displacement with said end faces flush, a sheet metal closure plate detachably carried by the bearing at said one end and comprising a flat body portion and a flat rim portion parallel to said end faces, and an annular loop resiliently connecting the body portion and the rim portion, the loop having walls of different length for holding the body portion offset outwardly from the plane of the rim portion to clear the adjacent race ring; substantially as described.

4. In a unit-handling antifriction bearing and lubricant retainer, an inner race ring and an outer race ring having their end faces substantially flush with one another at at least one end of the bearing, a series of rolling elements engaging opposed grooves in the race rings and holding the race rings from axial displacement with said end faces flush, a sheet metal closure plate detachably carried by the bearing at said one end and comprising a body portion, a rim portion, and an annular loop resiliently connecting the body portion and the rim portion and projecting between the race rings to yieldingly grip one of the latter, and means between the rim portion and the adjacent face of the race ring to hold the body portion spaced from the face of the other race ring; substantially as described.

5. In a unit-handling antifriction bearing and lubricant retainer, an inner race ring and an outer race ring having their end faces substantially flush with one another at one end of the bearing, the inner race ring projecting beyond the outer race ring at the other end of the bearing, a series of rolling elements engaging opposed grooves in the race rings and holding the race rings from axial displacement with said end faces flush, a sheet metal closure plate detachably carried by the bearing at said one end and comprising a body portion, a rim portion, and an annular loop resiliently connecting the body portion and the rim portion, a shell enclosing the outer race ring and closing the space between the race rings at said other end of the bearing, the shell having a flange engaging the end face of the outer race ring at said one end of the bearing, and the loop of the closure plate projecting laterally between the two rings and engaging the end of said flange; substantially as described.

6. In a unit-handling antifriction bearing and lubricant retainer, a pair of co-operating race rings having rolling elements between them, and a sheet metal closure plate detachably carried by the bearing and comprising a body portion, a rim portion, and a resilient and reversely curved portion connecting the body portion and the rim portion together, the body portion and the rim portion being substantially parallel to the ends of the race rings, the resilient portion entering between the race rings and yieldingly gripping one of them, and the rim portion extending alongside of said one race ring to limit the entry of the resilient portion between the race rings and to hold the body portion from contact with the other ring; substantially as described.

7. In a unit-handling antifriction bearing and lubricant retainer, a pair of co-operating race rings having rolling elements between them, and a sheet metal closure substantially closing the space between the rings, the closure having one portion in holding engagement with a peripheral surface of one of the rings, and another portion of the closure being extended beyond the other peripheral surface of said ring and adapted to key the said ring from rotation with respect to a support; substantially as described.

8. In a device of the character described, a pair of co-operating race rings having rolling elements between them, a support for one of the race rings and having a keyway, a closure substantially closing the space between the race rings, the closure having a holding portion entering between the race rings and secured to one of them, and the closure having another portion extended beyond the periphery of said race ring and entering the keyway; substantially as described.

9. In a device of the character described, a pair of co-operating race rings having rolling elements between them, a support for one of the race rings and having a keyway, a closure substantially closing the space between the race rings, the closure having a holding portion entering between the race rings and secured to one of the race rings, and a terminal tab on a peripheral edge of the closure and projecting axially along the periphery of said one race ring within the keyway; substantially as described.

LELAND D. COBB.